US008325022B2

(12) United States Patent
Lippincott

(10) Patent No.: US 8,325,022 B2
(45) Date of Patent: Dec. 4, 2012

(54) SYSTEM AND METHOD TO CONTROL A DEVICE USING A REMOTE CONTROL DEVICE AND A SOFT REMOTE CONTROL

(75) Inventor: Louis Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 11/233,827

(22) Filed: Sep. 22, 2005

(65) Prior Publication Data

US 2007/0063862 A1 Mar. 22, 2007

(51) Int. Cl.
*H04B 10/00* (2006.01)

(52) U.S. Cl. ...................... 340/13.24; 341/176; 348/734

(58) Field of Classification Search ............. 340/825.69, 340/3.1, 5.5, 13.24, 13.25, 13.2, 10.5; 341/176; 348/734

See application file for complete search history.

(56) References Cited

U.S. PATENT DOCUMENTS 6,313,643 B1 * 11/2001 Tirkel et al. ................... 324/642
6,469,633 B1 10/2002 Wachter
6,622,119 B1 * 9/2003 Ramaswamy et al. ............ 704/9
2004/0155791 A1 * 8/2004 Nguyen et al. ........... 340/825.69
2005/0151702 A1 * 7/2005 Kirkland et al. ............... 345/1.1
2007/0063046 A1 3/2007 Lippincott
2007/0067442 A1 3/2007 Lippincott

FOREIGN PATENT DOCUMENTS

JP 0200125366 A * 4/2000
WO WO 00/70578 * 11/2000
WO WO 00/70578 A 11/2000
WO 2007/038024 A1 4/2007

OTHER PUBLICATIONS

International Search Report for corresponding matter P22186PCT dated Jan. 3, 2007.

International Preliminary Report on Patentability for corresponding matter P22186PCT dated Apr. 3, 2008.

Office Action Received for China Patent Application No. 200610159534.4, mailed on Jun. 27, 2008, 7 pages of Chinese Office Action and 8 pages of English Translation.

Office Action Received for Chinese Patent Application No. 200910140545.1, mailed on Dec. 14, 2010, 20 pages of Chinese Office Action including 13 pages of English Translation.

* cited by examiner

*Primary Examiner* — Brian Zimmerman
*Assistant Examiner* — Yong Hang Jiang
(74) *Attorney, Agent, or Firm* — Jim Lynch law Firm

(57) ABSTRACT

A method and system for remotely controlling a device by using a remote control device and a soft remote control or device skin. The remote control device can be used to send commands to a soft remote control or device skin running as an application on a host device. The device skin incorporates soft control commands that can be used to remotely control an electronic device. The soft control commands are interpreted and forwarded by the host device to the electronic device.

20 Claims, 9 Drawing Sheets

SYSTEM AND METHOD TO CONTROL A DEVICE USING A REMOTE CONTROL DEVICE AND A SOFT REMOTE CONTROL

BACKGROUND

The importance for the consumer electronic device industry to continuously strive to produce products that are convenient to use cannot be overstated. No doubt this is one of the reasons for the introduction of the remote control. But, as the number of devices in a home that can be controlled remotely continues to grow, so does the frustration of trying to keep each device's remote control separate from other devices' remote controls. For example, today's homes may have a separate remote control for its television, digital video disk (DVD) player, video cassette recorder (VCR) player, compact disk (CD) player, set-top box, stereo receiver, media center, personal video recorder (PVR), etc. Trying to keep this many remote controls separate and easily locatable is not only a challenge but also reduces the ease and convenience of use of each of the electronic devices.

One attempt at a solution to the problem of having so many different remote controls is the universal remote control. Existing universal remote controls have several problems. First, they rely on storing infrared (IR) codes for every specific model of consumer electronics device in existence. With the number of consumer electronic devices available it is virtually impossible for a universal remote control manufacturer to cover the proprietary IR codes for every device on the market. In addition, unless the universal remote control allows for end user updates it will not be able to control future devices that are released after the production date of the original universal remote control. Another limitation of existing universal remote controls is that they are designed to support an existing feature set, and are not extensible to control future features unless provided with a mechanism to allow user updates. The thought of downloading and upgrading software in existing universal remote controls may make the prospect of buying a new device for the digital home less appealing to a user. Yet other limitations of existing universal remote controls are that they have too many buttons and the layout of the buttons on the remote control does not always match the intuitive placement users have in their minds for specific functions on particular devices. These limitations increase the frustration associated with using a universal remote control, especially in a dark room. Universal remote controls also tend to be expensive, especially if they provide a configurable screen and/or a touch screen for activation of the remote control keys.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
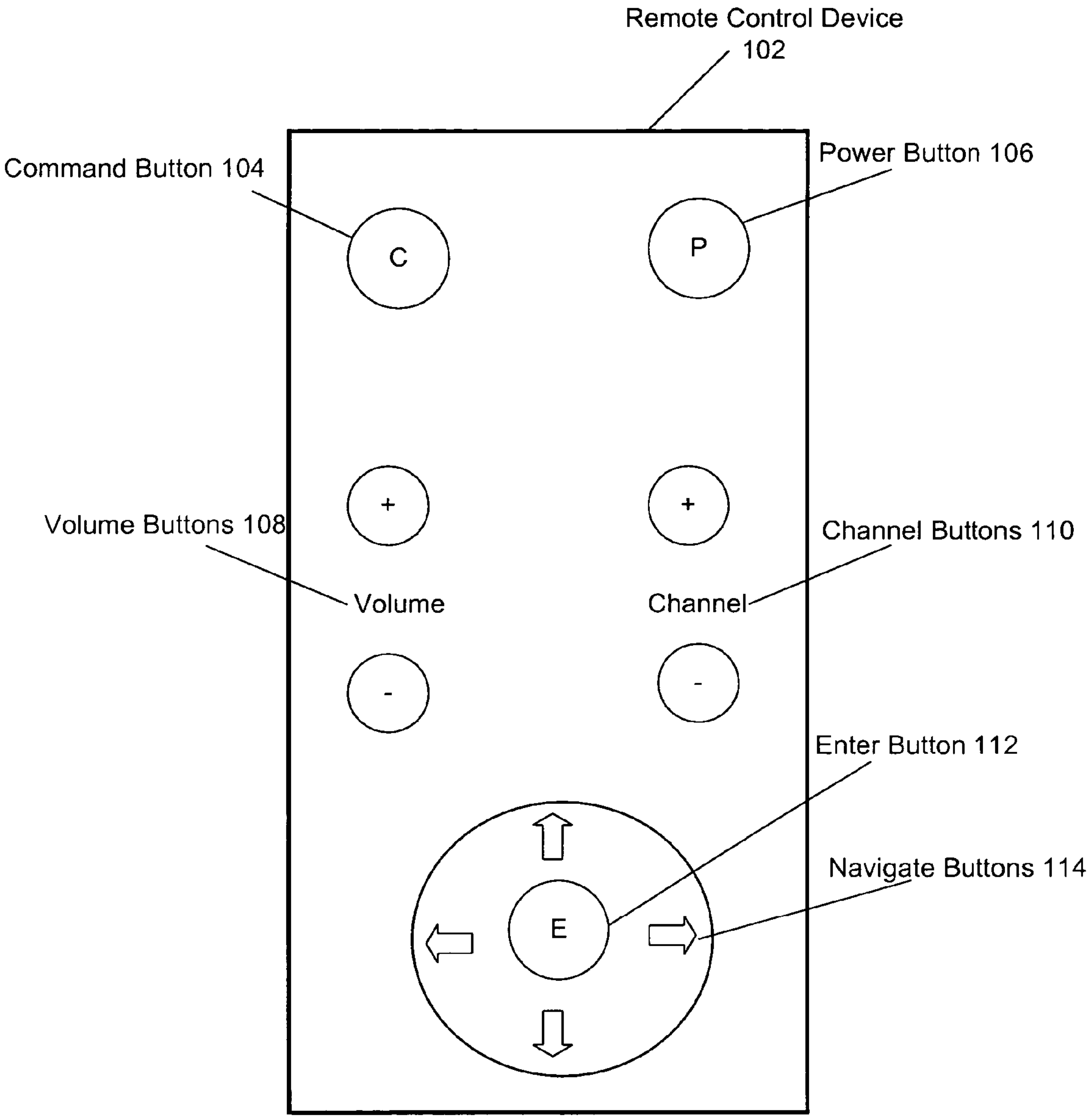
FIG. 1 illustrates one embodiment of a remote control device with a simple set of buttons that may be used in conjunction with the present invention.

According to an embodiment of the invention, a method and system for remotely controlling a device by using a remote control device and a soft remote control or device skin are described. Here, at least some of the problems described above may be alievated by providing a remote control device with a simple set of buttons that is easy to understand and use, even in a dark room. The remote control device can be used to send commands to a soft remote control or device skin running as an application on, for example, a digital television (DTV). The device skin incorporates soft control commands that can be used to remotely control an electronic device. The soft control commands are interpreted and forwarded by the DTV to the electronic device. In the following description, for purposes of explanation, numerous specific details are set forth. It will be apparent, however, to one skilled in the art that embodiments of the invention can be practiced without these specific details.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of a remote control device 102 with a simple set of buttons that may be used in conjunction with the present invention. The specific components shown in FIG. 1 represent one example of a configuration that may be suitable for the invention and is not meant to limit the invention.

Referring to FIG. 1, remote control device 102 may include, but is not necessarily limited to, a command button 104, a power on/off button 106, volume buttons 108 (volume up and down), channel buttons 110 (channel up and down), an enter button 112 and navigate buttons 114 (navigate up, down, left and right). In an embodiment not meant to limit the invention, remote control device 102 utilizes a simple set of buttons in order to send commands to a soft remote control or device skin running on a host device. In an embodiment of the invention, the host device may be a DTV. For example, and in an embodiment of the invention, remote control device 102 may be a typical handheld remote control that sends commands via infrared (IR) in order to select and activate soft control commands on a displayed device skin, but may also be any device capable of performing the functionalities described herein. In order to ensure that the electronic device to be controlled via the device skin cannot be operated by remote control device 102 directly, the IR commands from remote control device 102 are set at the wrong modulation frequency, protocol or bit patterns for the electronic device. The buttons shown in FIG. 1 will be described below in more detail with reference to FIGS. 5-8.

Figure 2:
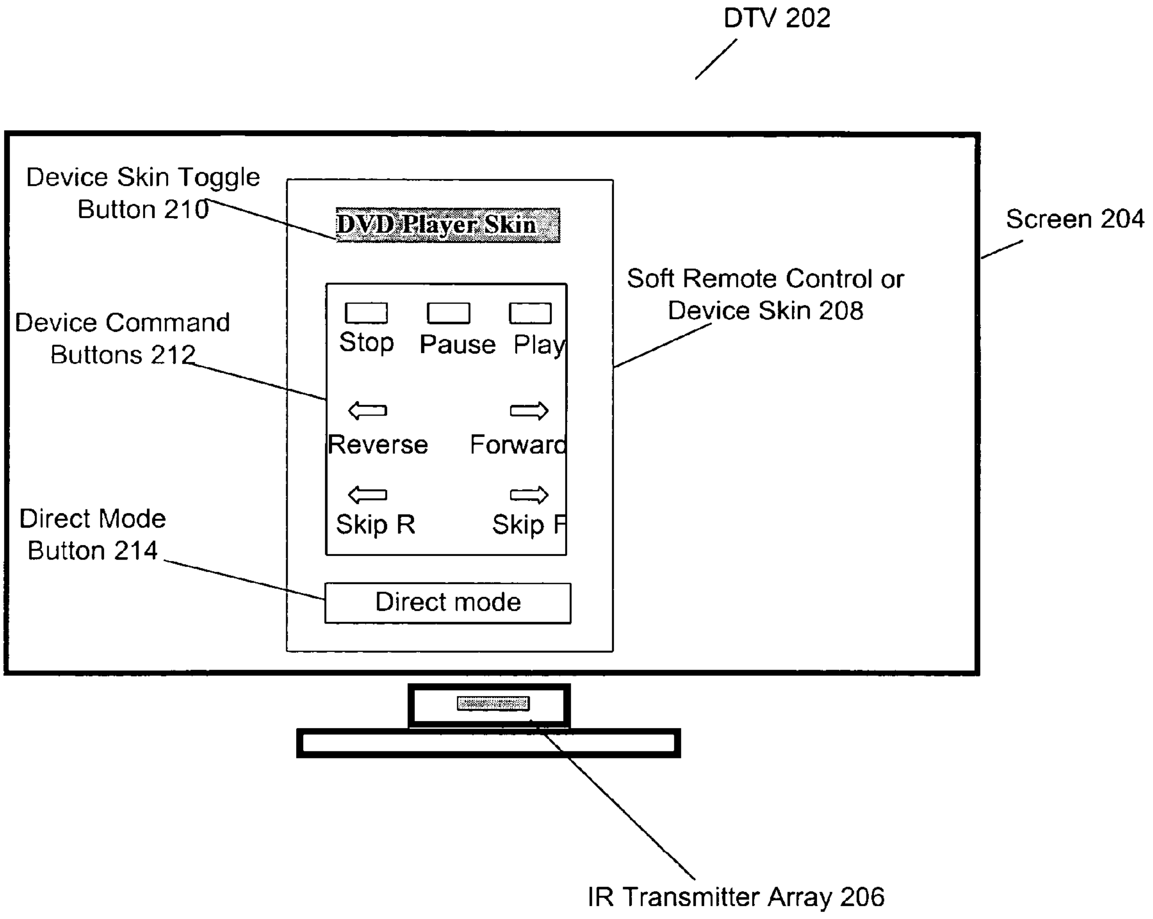
FIG. 2 illustrates an embodiment of a digital television (DTV) and example soft remote control or device skin that may be used in conjunction with the present invention.

FIG. 2 illustrates an embodiment of a digital television (DTV) 202 and an example soft remote control or device skin 208 that may be used in conjunction with the present invention. In an embodiment not meant to limit the invention, device skin 208 is a software-based remote control that runs on DTV 202 as an application. Soft control commands may be selected and activated on the device skin 208 via remote control device 102 to remotely operate an electronic device in proximity to DTV 202.

Referring to FIG. 2, DTV 202 is an example of a device used throughout the present application that may host the device skin and receive commands from remote control 102. DTV 202 is used for illustrations purposes only and may be any device that is capable of performing the functionalities described herein. For example, DTV 202 could be replaced by a media center, a personal computer, and so forth.

In an embodiment of the invention, DTV 202 may include, but is not necessarily limited to, a screen 204 and an IR transmitter array 206. Screen 204 may be any display means that is used to display device skin 208 to the user. An IR receiver (not shown) may be used by DTV 202 to receive IR commands from remote control device 102. IR transmitter array 206 may be used to "light up the room" with IR remote control commands for the particular device being controlled, and thus increasing the chance that the intended device will receive the commands no matter where it is placed in the room.

Device skin 208 illustrated in FIG. 2 is shown as a DVD player skin. The illustrated DVD player skin is provided for illustration purposes only and is not meant to limit the invention. The example device skin 208 illustrated in FIG. 2 may include, but is not necessarily limited to the following soft command buttons, a device skin toggle button 210, device command buttons 212 and a direct mode button 214. Device skin toggle button 210 indicates the current device skin being displayed and may be used to toggle through all device skins accessed by DTV 202. For example, the user may toggle through the stored device skins by selecting or highlighting device skin toggle button 210 and then repeatedly hitting command button 104 on remote control 102 to toggle through the stored device skins. This example use is not meant to limit the invention and is provided for illustration purposes only.

Device command buttons 212 is a set of soft command buttons that are particular for its device. For example, the DVD player skin may include the stop, pause, play, reverse, forward, skip reverse, and skip forward soft buttons to control the DVD player.

Direct mode button 214 allows for the immediate interpretation of the commands from remote control device 102 via a direct mode look-up mechanism (e.g., a look-up table). For example, by selecting the direct mode for a DVD player, the buttons on the remote control device 102 have implicit meanings defined in a lookup table for the DVD player. Direct mode is described in more detail below with reference to FIGS. 3 and 8. An alternative to direct mode is soft remote skin mode. In soft remote skin mode, the user highlights and selects soft commands on device skin 208 displayed on screen 204 of DTV 202 via remote control device 102. The commands are interpreted via DTV 202 and the device skin and sent to devices via IR transmitter array 206. Soft remote skin mode is described in more detail below with reference to FIGS. 3, 5, 6, 7A and 7B.

Figure 3:
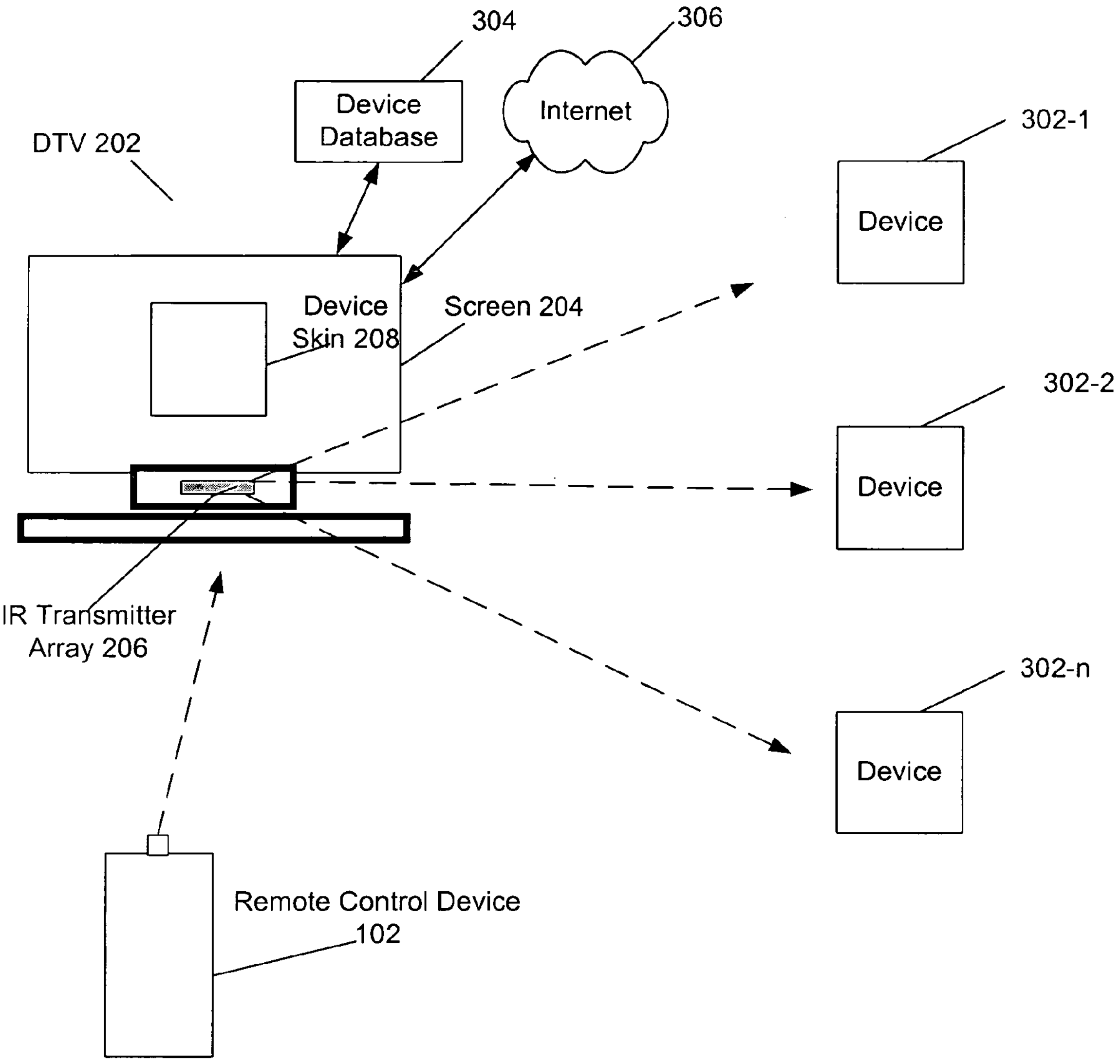
FIG. 3 illustrates one embodiment of an environment for controlling devices using a remote control device and a device skin, in which some embodiments of the present invention may operate.

FIG. 3 illustrates one embodiment of an environment for controlling devices using remote control device 102 and device skin 208, in which some embodiments of the present invention may operate. The environment may include, but is not necessarily limited to, remote control 102, DTV 204, one or more electronic devices 302 (302-1 to **302-*n*), a device database 304, and the Internet 306. In an embodiment not meant to limit the invention, DTV 204, device database 304, electronic devices 302 and the Internet 306** are in proximity to each other.

Devices 302 may be any electronic device capable of being remotely controlled. Examples of devices 302 include, but are not limited to, a television, a DVD player, a VCR player, a CD player, a set-top box, a stereo receiver, a media center, a PVR, and so forth. The present invention is not limited to typical devices found in a home. Although there are n devices shown in FIG. 1, the present invention may include one or more devices.

Device database 304 is any storage medium that is accessed by DTV 204 to obtain information about devices 302. This information may include, but is not necessarily limited to, modulation frequency, protocols, bit patterns, device skins, direct mode look-up tables, and so forth. DTV 204 may have access to the Internet 306 in order to download information stored in device database 304, including any future upgrades or extended feature sets for devices 302.

Figure 4A:
FIGS. 4A and 4B illustrate a possible timing relationship between remote control device IR pulses and device skin IR pulses, according to an embodiment of the invention.
Figure 4B:

As mentioned above, the IR commands from remote control device 102 are purposefully set at the wrong modulation frequency, protocol or bit patterns for devices 302 to guarantee that no operations are invoked by the remote control device 102 IR commands to devices 302 directly. FIGS. 4A and 4B illustrate an example timing relationship between IR pulses from remote control device 102 and IR pulses from device skin 208 (via IR transmitter array 206 in DTV 204). FIG. 4A illustrates an IR command from remote control device 102. FIG. 4B illustrates the interpreted IR command from device skin 208 via IR transmitter array 206. Device skin 208 via IR transmitter array 206 transmits the interpreted codes immediately after receiving and detecting the command from remote control device 102, with just enough dark time to allow devices 302 to recover from rejecting the IR command from remote control device 102. The timing relationship in FIGS. 4A and 4B are provided for illustration purposes only and are not meant to limit the invention.

As described above, the user may utilize remote control device 102 to send commands to DTV 204 either in a soft remote skin mode or in a direct mode to control devices 302. In the soft remote skin mode, the user highlights and selects soft control commands on device skin 208 displayed on screen 204 via remote control device 102. The commands are interpreted via device skin 208 and sent to devices 302 via IR transmitter array 206. The soft remote skin mode is described in more detail below with reference to FIGS. 5, 6, 7A and 7B.

In the direct mode, direct mode button 214 on device skin 208 allows for the immediate interpretation of the commands from the remote control device 102 via a direct mode look-up mechanism (e.g. a look-up table). For example, by selecting the direct mode for a DVD player the buttons on the remote control device 102 have implicit meanings defined in a lookup table. The navigate buttons 114 could have the same effect as the navigate buttons on the original DVD player remote control device. In other words, hitting the navigate up button on the remote control device 102 could cause the DTV 202 to send a navigate up command to the DVD player. Here, once the direct mode is activated, the user does not have to highlight and select soft commands on device skin 208. This allows the user direct control of the DVD player for operations such as navigating through menus, selecting subtitles, selecting languages, selecting scenes, etc. Table 1 below shows possible mappings of the remote control device buttons for the DVD player. Table 2 below shows possible mappings of the remote control device buttons for a CD player. These possible mappings are provided for illustration purposes only and are not meant to limit the invention. The direct mode of the present invention will be described in more detail below with reference to FIG. 8.

TABLE 1

| DVD Player | |
|---|---|
| Command Button | Returns to the soft remote control or device skin mode |
| Power Button | Power on/off the DVD player |
| Enter Button | Enter or Play |
| Volume Up Button | Volume up |
| Volume Down Button | Volume down |
| Channel Up Button | Next Chapter |
| Channel Down Button | Previous Chapter |
| Navigate Up Button | Navigate Up |
| Navigate Down Button | Navigate Down |
| Navigate Left Button | Navigate Left |
| Navigate Right Button | Navigate Right |

TABLE 2

| CD Player | |
|---|---|
| Command Button | Returns to the soft remote control or device skin mode |
| Power Button | Power on/off the CD player |
| Enter Button | Stop/Play (If stopped then Play or if playing then Stop) |
| Volume Up Button | Volume up |
| Volume Down Button | Volume down |
| Channel Up Button | User definable |
| Channel Down Button | User definable |
| Navigate Up Button | Previous CD (for multiple CD type players) |
| Navigate Down Button | Next CD (for multiple CD type players) |
| Navigate Left Button | Previous Track |
| Navigate Right Button | Next Track |

The flow diagrams and other descriptions of processes herein are not intended to imply a fixed order of performing the process stages. Rather, the process stages may be performed in any order that is practicable.

Figure 5:
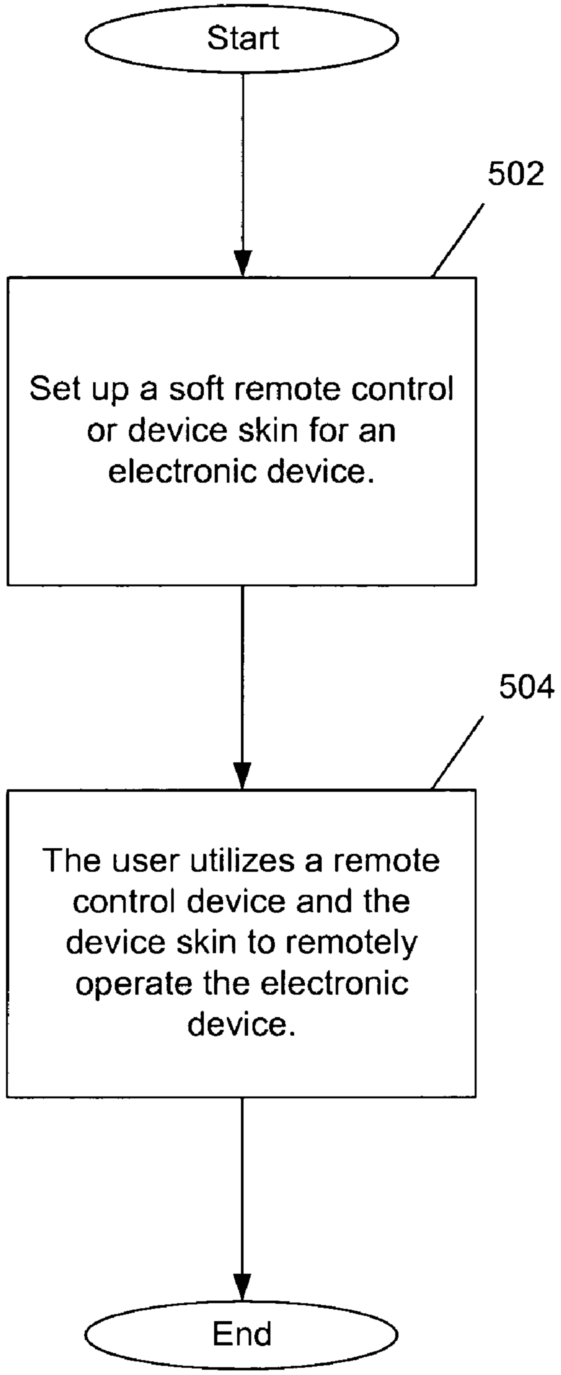
FIG. 5 is a flow diagram of one embodiment of a process for the operation of setting up a soft remote control or device skin for an electronic device and then utilizing that device skin to operate the electronic device.

FIG. 5 is a flow diagram of one embodiment of a process for the operation of setting up a soft remote control or device skin for an electronic device and then utilizing that device skin to operate the electronic device. Referring to FIG. 5, the process begins at processing block 502 where the user sets up a soft remote control or device skin (such as device skin 208 of FIG. 2) for an electronic device or target device (such as one of electronic devices 302-1 through 302-*n* of FIG. 3) to be remotely controlled. Processing block 502 is described in more detail below with reference to FIG. 6. At processing block 504, the user utilizes a remote control device (such as device 102 of FIG. 1) and the device skin to remotely operate the electronic device. Processing block 504 is described in more detail below with reference to FIGS. 7A and 7B. The flow diagram in FIG. 5 ends at this point.

Figure 6:
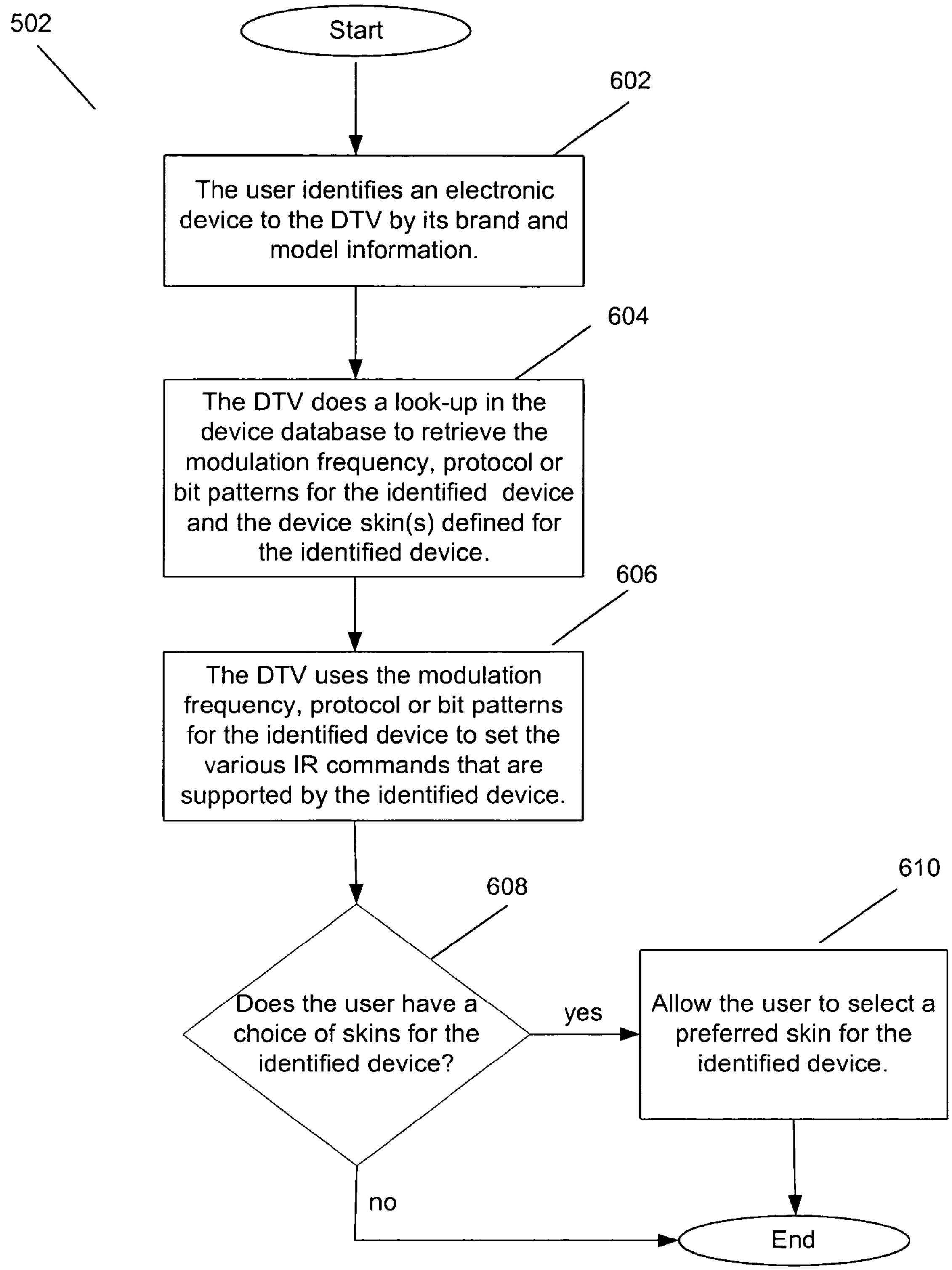
FIG. 6 is a flow diagram of one embodiment of a process for the operation of setting up the soft remote control or device skin.

FIG. 6 is a flow diagram of one embodiment of a process for the operation of setting up the soft remote control or device skin (step 502 of FIG. 5). Referring to FIG. 6, the process begins at processing block 602 where the user identifies an electronic device to the DTV. In an embodiment of the invention, the user may identify the electronic device by its brand and model information. At processing block 604, the DTV does a look-up in a device database (such as device database 304 from FIG. 3) to retrieve the modulation frequency, protocol or bit patterns for the identified device. DTV also may retrieve one or more device skins defined for the identified device. At processing block 606, the DTV uses the retrieved modulation frequency, protocol or bit patterns to set the various IR commands that are supported by the identified device. At decision block 608, it is determined whether the user has a choice of skins for the identified device (e.g., did the DTV retrieve more than one defined skin for the identified device). If the user does have a choice, then the user is allowed to select a preferred device skin to use with the identifed device. In an embodiment of the invention, the user may use the remote control device to interact with the DTV to customize a device skin. The flow diagram in FIG. 6 ends at this point.

Figure 7A:
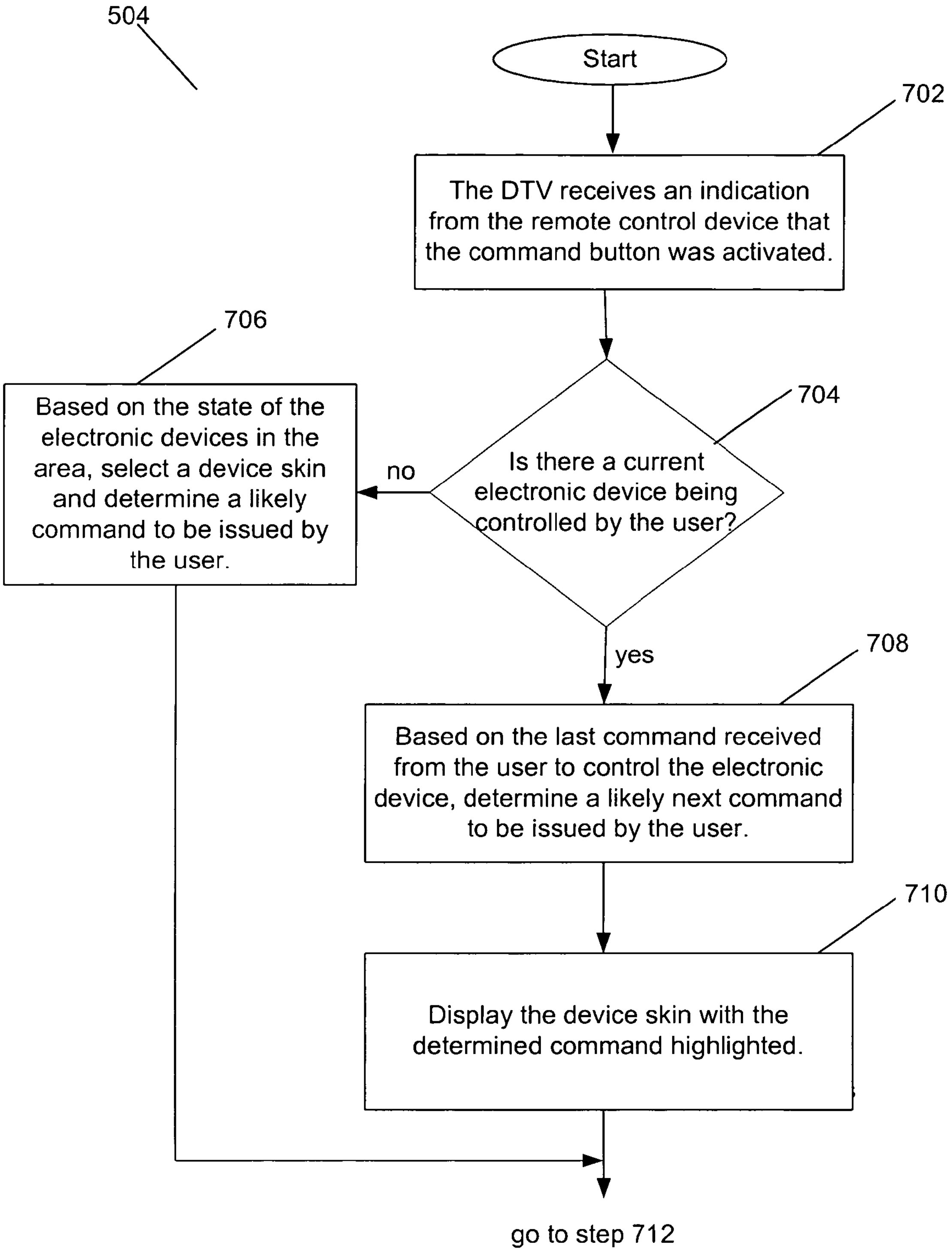
FIGS. 7A and 7B is a flow diagram of one embodiment of a process for the operation of utilizing the remote control device and device skin to operate the electronic device.
Figure 7B:
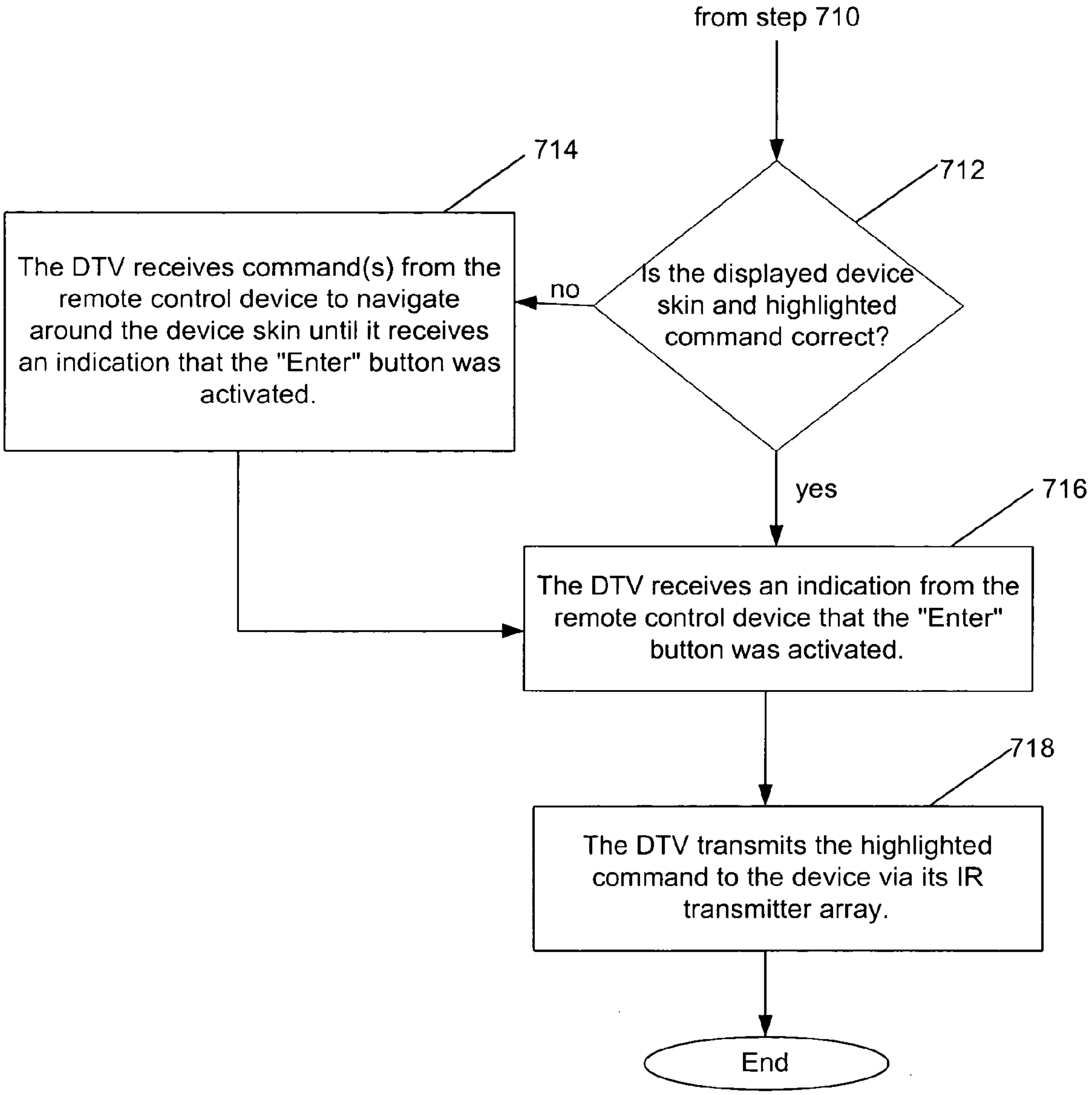

FIGS. 7A and 7B is a flow diagram of one embodiment of a process for the operation of utilizing the remote control device and device skin to operate the electronic device or target device (step 504 of FIG. 5). Referring to FIG. 7A, the process begins at processing block 72 where the DTV receives from the remote control device an indication that the command button (such as command button 104 from FIG. 1) was activated. 7At decision block 74, it is determined if there is a current electronic device being controlled by the user. If not, then at processing block 76, the DTV determines the state of the electronic devices. For example, the DTV may determine which electronic devices are powered on, the most frequently used electronic device, and so forth. Based on this information, the DTV may select a device skin and a likely soft command to be issued by the user on that selected device skin. For example, the DTV may determine that the DVD player and the CD player are currently powered on. The DTV may then determine that the DVD player in the past was used more often than the CD player. Thus, the DTV may select the device skin for the DVD player. The DTV may also determine that a likely command to be issued by the user is the play command. This example is provided for illustration purposes only and is not meant to limit the invention.

In processing block 78, it was determined in decision block 74 that an electronic device is currently being controlled by the user. Based at least partly on the last command received from the user to control the electronic device, the DTV determines a likely next soft command to be issued by the user. For example, if the user was watching a DVD movie and had previously issued the play command, the DTV may determine that it is likely that the user wants to pause the playing of the DVD. This example is provided for illustration purposes only and is not meant to limit the invention.

In processing block 70, the DTV displays the device skin (e.g., DVD player skin) with the determined likely soft command highlighted (e.g., play command or pause command). The flowchart in FIG. 7A continues in FIG. 7B. 7At decision block 72 of FIG. 7B, it is determined whether the currently displayed device skin and highlighted soft command are correct. If not, then the DTV receives one or more commands from the remote control device to navigate around the device skin until the DTV receives an indication that the enter button (such as enter button 112 of FIG. 1) was activated on the remote control device. Alternatively, it was determined that the displayed device skin and highlighted command was correct at decision block 72 and the DVT receives an indication from the remote control device that the enter button was activated at processing block 76. 7At processing block 78, the DTV transmits the highlighted command to the device via its IR transmitter array (such as IR transmitter array 206 from FIG. 2). The flowchart in FIGS. 7A and 7B ends at this point.

Figure 8:
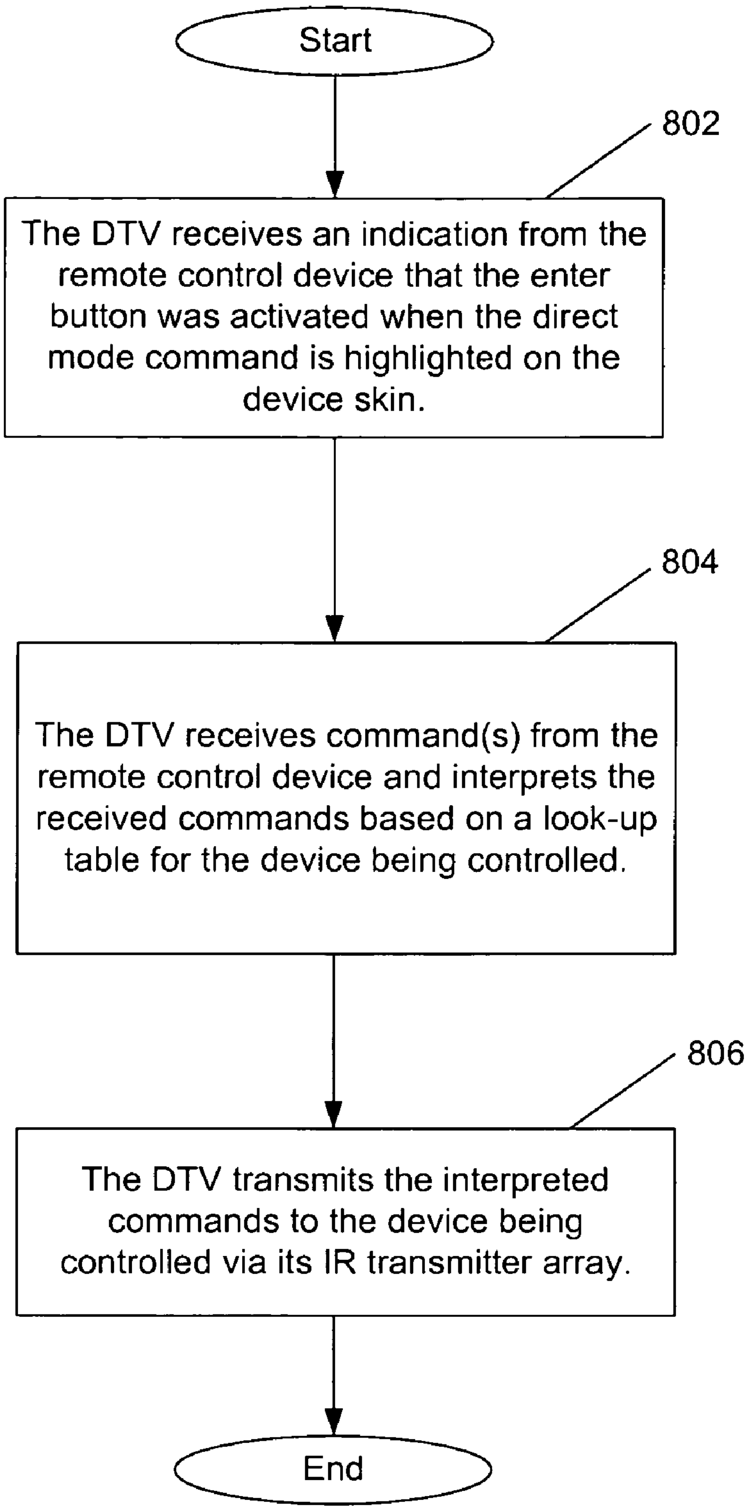
FIG. 8 is a flow diagram of one embodiment of a process for the operation of utilizing the remote control device to operate an electronic device in a direct mode of operation.

FIG. 8 is a flow diagram of one embodiment of a process for the operation of utilizing the remote control device to operate an electronic device in a direct mode of operation. Referring to FIG. 8, the process begins at processing block 802 where the DTV receives an indication from the remote control device that the user wants to activate the direct mode command on the device skin. In an embodiment of the invention, the user may use the remote control device to highlight the direct mode button (such as direct mode button 214 from FIG. 2) on the device skin and then activate the enter button (such as enter button 112 from FIG. 1) on the remote control device. At processing block 804, the DTV receives one or more commands from the remote control device and interprets the received commands based on a look-up mechanism (e.g., a look-up table) for the device being controlled. Two example look-up tables not meant to limit the invention were presently previously in Table 1 and Table 2. The DTV then transmits the interpreted commands to the device being controlled via its IR transmitter array (such as IR transmitter array 206 from FIG. 2) at processing block 806. The flow diagram in FIG. 8 ends at this point.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or the like.

Some portions of the detailed descriptions above are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising: receiving a user selection of a device skin for a target device, the selection from multiple device skins for the target device; displaying the selected device skin; receiving a command from a remote control device at a host device to remotely control the target device; interpreting the command in accordance with the selected device skin; and sending the interpreted command to the target device to remotely control the target device; wherein the selected device skin provides one or more soft commands for the target device; wherein the selected device skin further provides a direct mode activation command, and wherein the method further comprises: receiving a selection of the direct mode activation command available on the selected device skin from the remote control device at the host device; receiving a further command from the remote control device at the host device; interpreting the further command in accordance with a direct mode lookup mechanism; and sending the interpreted further command to the target device from the host device, based on the direct mode activation command selected from the device skin to remotely control the target device.

2. The method of claim 1, wherein the interpreted command is sent to the target device via an infrared (IR) transmitter array.

3. The method of claim 1: wherein a host device is running the soft remote control; and wherein the host device is a digital television (DTV).

4. A remote control device comprising a simple set of buttons, wherein the remote control device is to remotely control a target device via a device skin running on a host device, and wherein a command sent from the remote control device to a host device is interpreted in accordance with the device skin; wherein a user selects the device skin from multiple device skins corresponding to the target device; and wherein the selected device skin provides one or more soft commands for the target device; wherein the selected device skin further provides a direct mode activation command, and wherein the host device receives a selection of the direct mode activation command available on the selected device skin from the remote control device; receiving a further command from the remote control device at the host device; interpreting the further command in accordance with a direct mode lookup mechanism; and sending the interpreted further command to the target device from the host device, based on the direct mode activation command selected from the device skin to remotely control the target device.

5. The remote control device of claim 4, wherein the host device is a digital television (DTV).

6. A system comprising: a host device; wherein the host device to provide a device skin used to remotely control a target device, wherein the host device to issue an interpreted command to the target device based on a command received from a remote control device; wherein the received command is interpreted in accordance with one of the device skin and a user-selectable direct mode lookup mechanism; and wherein the device skin provides one or more soft commands for the target device; wherein the device skin provided by the host device is selectable from multiple device skins for the target device; wherein the device skin further provides a direct mode activation command, and wherein the method further comprises: receiving a selection of the direct mode activation command available on the device skin from the remote control device at the host device; receiving a further command from the remote control device at the host device; interpreting the further command in accordance with the direct mode lookup mechanism; and sending the interpreted further command to the target device from the host device, based on the direct mode activation command selected from the device skin to remotely control the target device.

7. The system of claim 6, wherein the interpreted command is sent to the target device via an infrared (IR) transmitter array.

8. The system of claim 6, wherein the host device is a digital television (DTV).

9. The system of claim 6, wherein the target device and the host device are in proximity to each other.

10. A non-transitory machine-readable medium containing instructions which, when executed by a processing system, cause the processing system to perform a method, the method comprising: receiving a user selection of a device skin for a target device, the selection from multiple device skins for the target device; displaying the selected device skin; receiving a command from a remote control device at a host device to remotely control the target device; interpreting the command in accordance with the selected device skin; and sending the interpreted command to the target device to remotely control the target device; wherein the selected device skin provides one or more soft commands for the target device; wherein the selected device skin further provides a direct mode activation command, and wherein the method further comprises: receiving a selection of the direct mode activation command available on the selected device skin from the remote control device at the host device; receiving a further command from the remote control device at the host device; interpreting the further command in accordance with a direct mode lookup mechanism; and sending the interpreted further command to the target device from the host device, based on the direct mode activation command selected from the device skin to remotely control the target device.

11. The machine-readable medium of claim 10, wherein the interpreted command is sent to the target device via an infrared (IR) transmitter array.

12. The machine-readable medium of claim 10:

wherein a host device is running the soft remote control; and wherein the host device is a digital television (DTV).

13. The method of claim 1, wherein interpreting the command in accordance with the selected device skin comprises determining a likely command to be issued by the user.

14. The remote control device of claim 4, wherein interpreting the command in accordance with the device skin comprises determining a likely next command to be issued by the user.

15. The system of claim 6, wherein interpreting the command in accordance with the device skin comprises determining a likely command to be issued by the user.

16. The machine-readable medium of claim 10, wherein interpreting the command in accordance with the selected device skin comprises determining a next likely command to be issued by the user.

17. The method of claim 1, further comprising setting at least one of modulation frequency, protocol and bit patterns for a remote control device to be different than modulation frequency, protocol and bit patterns for the target device.

18. The remote control device of claim 4, wherein the host device selects at least one of modulation frequency, protocol and bit patterns for the remote control device to be different than modulation frequency, protocol and bit patterns for the target device.

19. The system of claim 6, wherein the host device selects at least one of modulation frequency, protocol and bit patterns for the remote control device to be different than modulation frequency, protocol and bit patterns for the target device.

20. The machine-readable medium of claim 10, wherein the method further comprises setting at least one of modulation frequency, protocol and bit patterns for the remote control device to be different than modulation frequency, protocol and bit patterns for the target device.

* * * * *